(12) United States Patent
Bergström

(10) Patent No.: US 7,738,506 B1
(45) Date of Patent: Jun. 15, 2010

(54) METHOD AND SYSTEM FOR COMMUNICATION

(75) Inventor: Anders Bergström, Mölndal (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1625 days.

(21) Appl. No.: 10/480,447

(22) PCT Filed: Jun. 12, 2001

(86) PCT No.: PCT/SE01/01326

§ 371 (c)(1),
(2), (4) Date: Dec. 12, 2003

(87) PCT Pub. No.: WO02/102110

PCT Pub. Date: Dec. 19, 2002

(51) Int. Cl.
*H04J 3/06* (2006.01)
(52) U.S. Cl. ............ 370/509; 370/512; 370/514; 455/502
(58) Field of Classification Search .......... 455/350; 370/503–514, 328, 338
See application file for complete search history.

(56) References Cited

U.S. PATENT DOCUMENTS

| | | | | |
|---|---|---|---|---|
| 7,023,835 | B2* | 4/2006 | Terry | 370/350 |
| 2001/0046240 | A1* | 11/2001 | Longoni et al. | 370/503 |

FOREIGN PATENT DOCUMENTS

| | | |
|---|---|---|
| WO | 01/01596 A1 | 1/2001 |
| WO | 01/30103 A1 | 4/2001 |

OTHER PUBLICATIONS

Tech Spec., 3GPP TS 25.415 V4.7.0, $3^{rd}$ Generation Partnership Project; Technical Specification Group Radio Access Netowrk; UTRAN lu Interface User Plane Protocols (Release 4), Dec. 2002.
Tech Spec., 3GPP TS 25.420 V3.10.0, $3^{rd}$ Generation Partnership Project; Technical Specification Group Radio Access Netowrk; Synchronisation in UTRAN Stage 2 (Release 1999), Jun. 2002.
Tech Spec., 3GPP TS 25.427 V4.4.0, $3^{rd}$ Generation Partnership Project; Technical Specification Group Radio Access Netowrk; UTRAN Iub/Iur Interface User Plane Protocol for DCH Data Streams (Release 4), Dec. 2002.

* cited by examiner

*Primary Examiner*—Temica M Beamer
(74) *Attorney, Agent, or Firm*—Nixon & Vanderhye PC

(57) ABSTRACT

The present invention relates to a method for synchronization of real-time signals between core network and air interface in a UMTS Terrestrial Radio Access Network (UTRAN). The synchronization of the signals is needed to make a feasible connection between user equipment and a core network. This is achieved by using the timing knowledge from the protocols that are to be synchronized, and recalculating synchronization parameters for both uplink and downlink transmission. By using frame numbers instead of time of arrivals of frames, the present invention gives better control of timing and avoids long delays, and handles the problems with time alignments.

26 Claims, 2 Drawing Sheets

METHOD AND SYSTEM FOR COMMUNICATION

This application is the US national phase of international application PCT/SE01/01326, filed in English on 12 Jun. 2001, which designated the US. The entire contents of this application is incorporated herein by reference.

TECHNICAL FIELD

The present technology relates in general to the field of radio telecommunications and more particularly to a method for synchronisation of real-time signals between core network and air interface in a UMTS Terrestrial Radio Access Network (UTRAN).

DESCRIPTION OF RELATED ART

The Third Generation Partnership Project (3GPP) is currently in the process of standardising a new set of protocols for mobile telecommunications systems. The set of protocols is known collectively as Universal Mobile Telecommunications System (UMTS).

In FIG. 1 a part of a UMTS network is illustrated schematically. The network includes a core network, which may be a network handling circuit switched voice calls using UMTS Mobile-services Switching Centres (UMSCs) or may be a data network (SGSNs). A subscriber or User Equipment UE is coupled to the core network via an access network referred to as a Universal Terrestrial Radio Access Network (UTRAN). More particularly, the UMSCs are connected to Radio Network Controllers (RNCs) of the UTRAN over an interface referred to as the Iu interface.

As shown in FIG. 2, each RNC forms part of a Radio Network Subsystem which also comprises a set of Base Transceiver Stations referred to in UMTS terminology as Node B's. The interface between a RNC and a Node B is known as the Iub interface. Node B provides connection points for a UE to the UTRAN, and the interface between Node B and the UE is known as the Uu interface. The RNC which holds the connection for the UE at any given time is referred to as the Serving RNC (SRNC).

When a user plane connection establishment is required the responsible UMSC/SGSN instructs the UTRAN to establish a logical connection between the UMSC/SGSN and the UE. This logical connection is referred to as a Radio Access Bearer (RAB). The connection between the SRNC and the core network is referred to as the Iu bearer whilst the connection between the SRNC and the UE is referred to as the Radio Bearer. Both of these bearers represent further logical channels, with the SRNC performing a mapping between them. The bearers themselves are mapped onto appropriate traffic channels for transmission over the respective interfaces Iu and Uu.

The interface Uu, shown in FIGS. 1 and 2, is as mentioned above, the radio interface between UTRAN and the user equipment UE, for example a mobile phone. Timing over Uu is controlled by connection frame numbers CFN.

CFN is the frame counter used between user equipment and UTRAN. A CFN value is associated to each Transport Block Set (TBS) and it is passed together with it through the MAC-Layer1 Service Access Point (SAP). CFN provides a common frame reference to be used for ciphering and synchronised transport channel reconfiguration.

For the interface Uu, CFN is increased by 1 for each frame of 10 ms, and the range of CFN is from 0 to 255 for all channels except PCH, in which the range is from 0 to 4095. Either a RNC or a SRNC controls the CFN. The nodes RNC, SRNC also handle the downlink transmission and acts as a final point in uplink.

Transmission over Uu is allowed at certain specified intervals TTI (Transmission Time Interval) for the specific channel, concerning both uplink and downlink. Between the TTI and CFN is a relationship, for example if TTI is 20 ms, the CFN must be even each time the transmission starts. From this follows that every transmission over Uu consists of two CFN frames, for example M and M+1 as shown in FIG. 3. Next transmission over Uu will then be M+2 and M+3, i.e. two-by-two continuously until all data is sent.

The interface Iu, shown in FIGS. 2 and 3, handles the interconnection between the core network and one or more Radio Network Controllers in the UTRAN.

If Radio Access Bearers have been set up with certain parameters, time related parameters are used over Iu, otherwise sequential numbers are used. In the case that RAB's are set up with traffic class either conversational or streaming and support mode is used for the Iu user plane, time related frame numbers will be used.

The support modes are intended for those RAB's that do require particular features from the Iu user plane protocol in addition to transfer of user data. When support mode of the Iu user plane protocol is used, frame numbers are used over Iu.

Time related frame number means that the frame number is increased by 1 for each ITI (Iu Timing Interval), and the range of Iu frame numbers are from 0 to 15.

Within the standardisation discussions in 3GPP there is no specified connection between these numbers, Iu frame number and connection frame number CFN, since each protocol keeps track of its own timing.

SUMMARY OF THE TECHNOLOGY

A problem with the existing solutions today is that each protocol has its own timing. If using bad solutions this can cause long delays and problems with time alignment, and also cause shifting in timing between the core network and the UE. Furthermore the standardisation discussions do not cover solutions for synchronisation of these protocols, since that is considered to be implementation details that each manufacturer could implement their way and use as means for competition.

The object of the present technology is thus to alleviate the problems above by providing a feasible method to synchronise the above-mentioned protocols and keep a constant timing in-between them.

Using the timing knowledge from each of the related protocols, and recalculating synchronisation parameters for both uplink and downlink solves the above problem.

An important technical advantage is that a method is provided for synchronisation of two different protocols and by that keeping a constant timing between them.

Another advantage is that it gives a better control of timing, when using frame numbers instead of time of arrivals, and by that avoids long delays and handles time alignments.

The present technology also gives the advantage of avoiding ATM cell delay variation (jitters).

DESCRIPTION OF PREFERRED EMBODIMENTS

Figure 1:
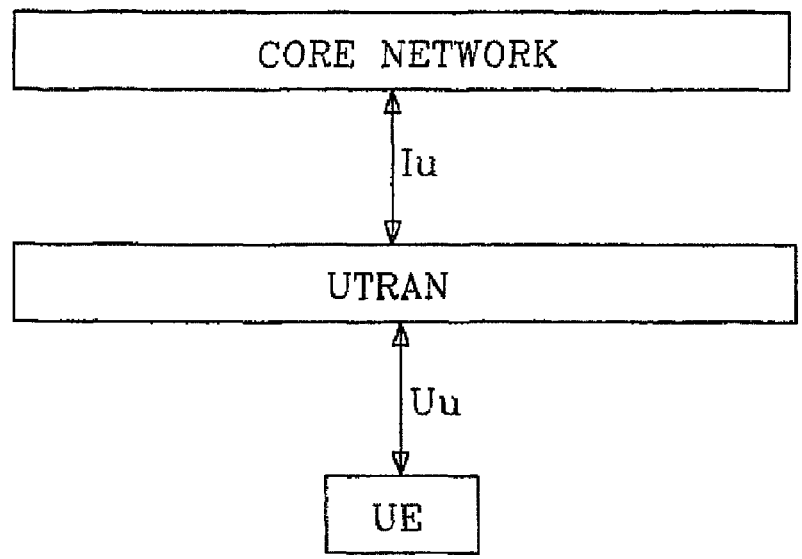
FIG. 1 illustrates parts of the UMTS architecture.
Figure 2:
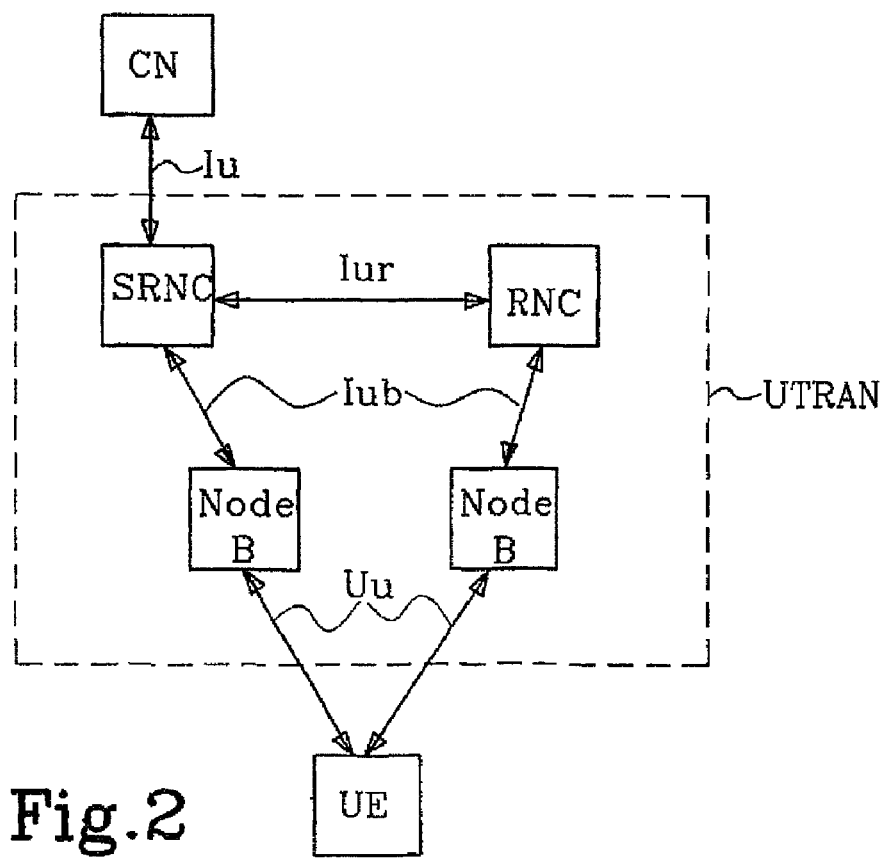
FIG. 2 illustrates a more detailed part of an UMTS network.

Since the CFN and Iu frame number are not connected the present technology solves this by calculating a new CFN and Iu frame number using the known timing information within the Iu and Uu protocols.

These calculations are done separately on uplink and downlink.

When transmitting on uplink, there is a need to synchronise between the Uu interface that is originated from the user equipment UE and the Iu interface which connects to the core network. This synchronisation is done by using the connection frame number CFN from Uu and calculating a corresponding Iu frame number $FN_{Iu}$. The Iu interface timing interval ITI is also used in these calculations. The following described embodiments are exemplified with an ITI of 20 ms, however ITI can take other values, depending on different circumstances. It also assumes a TTI value of 20 ms, however that value can change.

The new Iu frame number is given by dividing the Uu connection frame number CFN with ITI/10 ms and then modulating with 16 to get a frame number between 0 and 15 that matches the scope of $FN_{Iu}$. The reason to divide with ITI/10 ms is that CFN is 10 ms oriented and ITI needs to be compensated for that.

This compensation can take different forms since the values for TTI and ITI can be different. The first case is when ITI is smaller than TTI, which implies that several Iu frames can be sent together at the same time over Uu.

The second case is the opposite, when ITI is larger than TTI, which implies that the Iu frame has to be divided up into smaller fragments to be able to be transmitted over Uu.

Consequently, these two cases have its opposites in uplink transmission.

In the third case where ITI equals TTI, the synchronisation is done according to the following described embodiments and formulas.

If needed, it can also come into question to change the latest time of arrival ToAwE to wait for several frames to arrive at Node B.

The synchronisation calculation for uplink transmission when ITI and TTI are equal can be described according to the following formula:

$$FN_{Iu} = \left\lfloor \left( \frac{CFN}{ITI/10ms} \right) \right\rfloor \mod 16$$

When Transmitting in the Opposite Direction, downlink, there is a need to synchronise the Uu interface, which connects to the user equipment UE, with the Iu interface that connects UTRAN with the core network. This is done when all the data, sufficient to form a TTI over the Uu, has arrived initially from the core network.

The new connection frame number $CFN_{pres}$ for Uu to be sent is given by adding the previous connection frame number $CFN_{prev}$ with the difference between the two most recent frame numbers $FN_{Iu,pres}$ and $FN_{Iu,prev}$ for Iu, where the difference is first added to the number of wraps of timing there has been on the Iu interface and then multiplied with ITI/10 ms to get correct timing information. This sum is then modulated with 256 to get a frame number between 0 and 255 that matches the scope of Uu.

The difference between the Iu data is used to set the CFN according to the following formula:

$$CFN_{pres} = \left[ CFN_{prev} + \left\lfloor \frac{ITI}{10ms}(FN_{Iu,pres} - FN_{Iu,prev} + 16N_{16}) \right\rfloor \right] \mod 256$$

The $CFN_{pres}$ is the CFN to be set to the frame that is next to be transmitted over Uu and the $CFN_{prev}$ is the CFN for the most recently transmitted frame over Uu. The same applies for the frame numbers over Iu $FN_{Iu,pres}$, $FN_{Iu,prev}$. $N_{16}$ denotes the number of wraps of timing there has been on the Iu interface due to the fact that the frame numbers over Iu have wrapped around.

Figure 3:
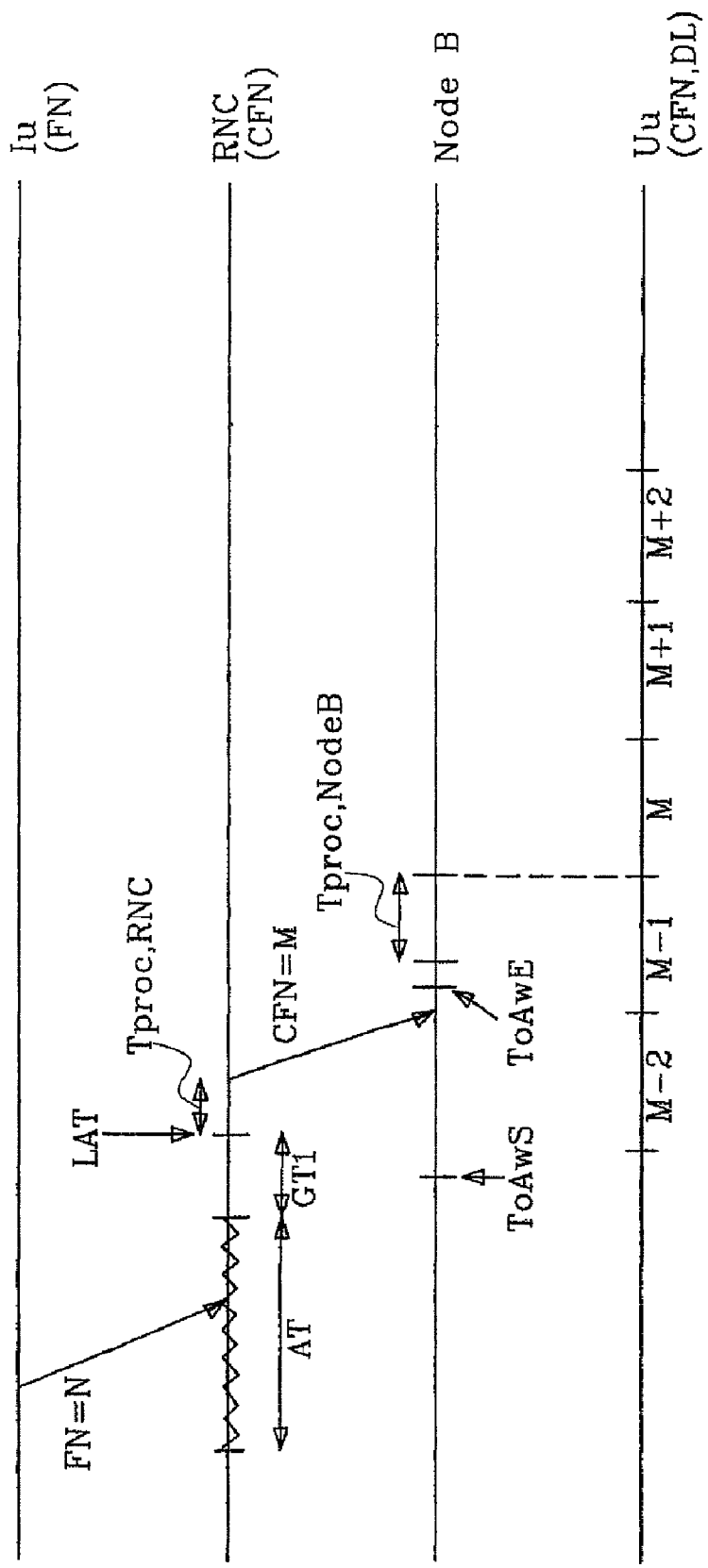
FIG. 3 illustrates a timing diagram for downlink transmission.

If there is no previous frame number $FN_{Iu,prev}$ for Iu, i.e. the RNC is awaiting the first frame, there is needed a guard time GT1 shown in FIG. 3. This guard time is needed to wait and collect the first frame before the latest time LAT for the frame from Iu is available for processing during Tproc,RNC in RNC before sending it to Node B.

FIG. 3 shows a timing diagram for downlink transmission, assuming a TTI of 20 ms and that M is even. The timing diagram shows how the initial determination for Iu frame number FN=N is mapped to the Uu connection frame number CFN=M in downlink.

The First frame M is sent over Iu, arrives within a certain time AT to be stamped as connection frame number CFN=M. This means that the frame must arrive within this time period AT to be valid for further processing. There is also a guard time GT1 for the first frame, which determines the latest time LAT for the frame from Iu to be available.

After that follows a processing time Tproc,RNC within the RNC before the frame M can be sent to Node B over Iub.

At Node B there is also a limited time for the frame to arrive, to be in time for transmission over Uu to the user equipment UE. The earliest time of arrival ToAwS and the latest time of arrival ToAwE define this time. The Node B also has a processing time Tproc,NodeB before the frame can be sent.

Node B then transmits the frames over Uu to the user equipment UE. Since the length of CFN is 10 ms and the transmission timing interval TTI is 20 ms, each transmission will consist of two frames, for example M and M+1 the first time, and then M+2 and M+3 in next transmission.

The above-described embodiments assume that the transmission timing interval TTI is the same as the Iu interface timing interval ITI. This is however not always the case. For the first frame in downlink transmission this could be the case, since that frame number is only allowed certain values. Other cases in downlink transmission are that the Iu frame is divided up in several pieces, the case when ITI is larger than TTI, or you have to await several Iu frames before you can send on Uu, another case is when ITI is smaller than TTI.

When the above mentioned first case occurs, where ITI is smaller than TTI, the formula for the frame number $FN_{Iu,f}$ of first frame on Iu in uplink synchronization can be described as the following:

$$FN_{Iu,f} = \left\lfloor \left( \frac{CFN_{first}}{ITI/10ms} \right) \right\rfloor \mod 16$$

where $CFN_{first}$ is CFN of first frame of all frames over Uu needed to form a frame over Iu in this case. After the first frame has been decided, the frame number $FN_I$, can repeatedly be described with the following formula:

$$FN_{Iu} = (FN_{Iu} + k) \mod 16$$

where k is a number increased stepwise between 1 and (ITI/TTI)−1.

The formula for downlink synchronization in the first case can be described as the following:

$$CFN_{pres,f} = \left(CFN_{prev,f} + \left\lfloor\left(\frac{ITI}{10ms}(FN_{Iu,pres,f} - FN_{Iu,prev,f} + 16N_{16})\right)\right\rfloor\right) \mod 256$$

where $FN_{Iu,pres,f}$ is the first frame over Iu used to form this frame over Uu. Care must however be taken not to cause slips.

Second case when ITI is larger than TTI and synchronization in uplink, the frame number can be described according to the following formula:

$$FN_{Iu,f} = \left\lfloor\left(\frac{CFN_{first}}{ITI/10ms}\right)\right\rfloor \mod 16$$

where $CFN_{first}$ is the CFN of the first frame of all needed frames to form a frame over Iu. In this case ITI/TTI frames over Uu are needed. However the frame number may be picked arbitrarily among the frames over Iu.

For downlink synchronization in this the second case, the formula can be described as the following:

$$CFN_{pres,f} = \left(CFN_{prev,f} + \left\lfloor\frac{ITI}{10ms}(FN_{Iu,pres,f} - FN_{Iu,prev,f} + 16N_{16})\right\rfloor\right) \mod 256$$

where $CFN_{pres,f}$ is first frame in downlink for the frames to be transmitted over Uu due to the arrival of the frame over Iu. $CFN_{prev,f}$ is the first frame in the previous transmission interval. Repeatedly after that the frame number $CFN_{pres}$ can be described as the following formula:

$$CFN_{pres} = \left(CFN_{pres,f} + k * \frac{TTI}{10ms}\right) \mod 256$$

where k is a number increased stepwise between 1 and (ITI/TTI).

The technology is not intended to be limited only to the embodiments described in detail above. Changes and modifications may be made without departing from the technology; for example changes in the environment can cause changes to the above-described structure, and the need of tuning of the formulas. The technology covers all modifications within the scope of the following claims.

The invention claimed is:

1. A method for uplink synchronisation between a first protocol used for communications between user equipment and a base station of a UMTS Terrestrial Radio Access Network and a second protocol used for communications between a radio network controller of the UMTS Terrestrial Radio Access Network and a core network, where timing over the first protocol is controlled by a connection frame number, and timing over the second protocol is controlled by frame numbers, the method comprising:

determining the connection frame number for one or more frames of uplinked data received by a base station from user equipment via the first protocol; and calculating a frame number for the second protocol based on the determined connection frame number.

2. A method according to claim 1, wherein the calculating step comprises:

dividing the determined connection frame number with a denominator, to achieve correct timing; and modifying the quotient obtained in the dividing step to obtain a correct frame number based on the scope of said second protocol.

3. A method according to claim 2, wherein said denominator corresponds to the timing interval of said second protocol divided by a time value to achieve correct timing information.

4. A method according to claim 1, wherein the calculating step determines the frame number $FN_{Iu}$, for said second protocol based on the following formula, wherein CFN is the connection frame number, and wherein ITI is the timing interval in the second protocol:

$$FN_{Iu} = \left\lfloor\left(\frac{CFN}{ITI/10ms}\right)\right\rfloor \mod 16.$$

5. A method for downlink synchronisation between a first protocol used for communications between user equipment and a base station of a UMTS Terrestrial Radio Access Network and a second protocol used for communications between a radio network controller of the UMTS Terrestrial Radio Access Network and a core network, where timing over the first protocol is controlled by a connection frame number, and timing over the second protocol is controlled by frame numbers, the method comprising:

determining a frame number of one or more frames of data received from a core network via the second protocol; and calculating a connection frame number for the first protocol based on the determined frame number of said second protocol.

6. A method according to claim 5, wherein said calculating step is based on a difference between several received frame numbers of the second protocol.

7. A method according to claim 5, wherein said calculating step is based on a timing factor of a timing interval of said second protocol divided by a time value.

8. A method according to claim 5, wherein the calculating step is based on the previous sent frame number of the first protocol.

9. A method according to claim 5, wherein the calculating step uses the following formula, wherein $CFN_{pres}$ is the calculated connection frame number, wherein $CFN_{prev}$ is a previously sent frame number of the first protocol, wherein $FN_{Iu,pres}$ is the present frame number of the second protocol, wherein $FN_{Iu,prev}$, is the previously sent frame number of the second protocol, and wherein $N_{16}$ is the number of wraps of timing that have occurred in the second protocol between $FN_{Iu,prev}$ and $FN_{Iu,pres}$:

$$CFN_{pres} = \left[CFN_{prev} + \left\lfloor\frac{ITI}{10ms}(FN_{Iu,pres} - FN_{Iu,prev} + 16N_{16})\right\rfloor\right] \mod 256.$$

10. A method according to claim 5, wherein a guard period defines a safety margin for the first frame of the first protocol to arrive.

11. A method according to claim 5, wherein a latest arrival time is defined as the latest time a frame of the first protocol can arrive to be handled.

12. A method according to claim 5, wherein an arrival time is defined as the time wherein the frame of the first protocol is expected to arrive.

13. A method according to claim 10, wherein said guard period is defined as the difference between latest arrival time and the end point of arrival time.

14. An UMTS Terrestrial Radio Access Network system where timing over a first protocol used for communications between user equipment and a base station of the UMTS Terrestrial Radio Access Network is controlled by a connection frame number and timing over a second protocol used for communications between a radio network controller of the UMTS Terrestrial Radio Access Network and a core network is controlled by frame numbers, comprising:

means for determining a connection frame number of a frame of data received over the first protocol; and means for calculating a frame number in the second protocol based on the determined connection frame number of said first protocol to achieve uplink synchronization between said protocols.

15. A system according to claim 14, wherein the calculating means divides the determined connection frame number with a denominator to achieve correct timing, and modifies this quotient to obtain a correct frame number for a scope of said second protocol.

16. A system according to claim 15, wherein said denominator corresponds to a timing interval of said second protocol divided by a time value to achieve correct timing information.

17. A system according to claim 14, wherein the calculating means uses the following formula to calculate the frame number $FN_{Iu}$ for said second protocol, wherein CFN is the connection frame number, and wherein ITI is a timing interval of the second protocol:

$$FN_{Iu} = \left\lfloor \left( \frac{CFN}{ITI/10ms} \right) \right\rfloor \mod 16.$$

18. An UMTS Terrestrial Radio Access Network system, where timing over a first protocol used for communications between user equipment and a base station of the UMTS Terrestrial Radio Access Network is controlled by a connection frame number, and timing over a second protocol used for communications between a radio network controller of the UMTS Terrestrial Radio Access Network and a core network is controlled by frame numbers, comprising:

means for determining a frame number of a frame of data received over the second protocol; and means for calculating a connection frame number in the first protocol for the frame of data based on the determined frame number to achieve downlink synchronization between said protocols.

19. A system according to claim 18, wherein said calculating means uses a difference between several received frame numbers to calculate the connection frame number.

20. A system according to claim 18, wherein said calculating means uses a timing factor of the timing interval of said second protocol divided by a time value to calculate the connection frame number.

21. A system according to claim 18, wherein the calculating means determines the connection frame number based on a previous sent connection frame number.

22. A system according to claim 18, wherein the calculating means calculates the connection frame number for said first protocol based on the following formula, wherein $CFN_{pres}$ is the present connection frame number, wherein $CFN_{prev}$ is a previously sent frame number of the first protocol, wherein $FN_{Iu,pres}$ is the present frame number of the second protocol, wherein $FN_{Iu,prev}$ is the previously sent frame number of the second protocol, and wherein $N_{16}$ is the number of wraps of timing that have occurred in the second protocol between $FN_{Iu,prev}$ and $FN_{Iu,pres}$:

$$CFN_{pres} = \left[ CFN_{prev} + \left\lfloor \frac{ITI}{10ms}(FN_{Iu,pres} - FN_{Iu,prev} + 16N_{16}) \right\rfloor \right] \mod 256.$$

23. A system according to claim 18, wherein a guard period defines a safety margin for the first frame of the second protocol to arrive.

24. A system according to claim 18, wherein a latest arrival time is defined as the latest time a frame of the second protocol can arrive to be handled.

25. A system according to claim 18, wherein an arrival time is defined as the time wherein the a frame of the second protocol is expected to arrive.

26. A system according to claim 23, wherein said guard period is defined as the difference between latest arrival time and the end point of arrival time.

* * * * *

UNITED STATES PATENT AND TRADEMARK OFFICE
CERTIFICATE OF CORRECTION

PATENT NO. : 7,738,506 B1
APPLICATION NO. : 10/480447
DATED : June 15, 2010
INVENTOR(S) : Bergström It is certified that error appears in the above-identified patent and that said Letters Patent is hereby corrected as shown below:

On the Title Page, in Field (54), in Title, delete "METHOD AND SYSTEM FOR COMMUNICATION" and insert -- SYNCHRONISATION IN A TERRESTRIAL RADIO ACCESS NETWORK (UTRAN) --, therefor.

On the Title Page, in Field (56), under "OTHER PUBLICATIONS", in Column 2, Line 2, delete "Netowrk;" and insert -- Network; --, therefor.

On the Title Page, in Field (56), under "OTHER PUBLICATIONS", in Column 2, Line 3, delete "lu" and insert -- Iu --, therefor.

On the Title Page, in Field (56), under "OTHER PUBLICATIONS", in Column 2, Line 5, delete "Netowrk;" and insert -- Network; --, therefor.

On the Title Page, in Field (56), under "OTHER PUBLICATIONS", in Column 2, Line 8, delete "Netowrk;" and insert -- Network; --, therefor.

On the Title Page, in Field (56), under "OTHER PUBLICATIONS", in Column 2, Line 9, delete "lub/lur" and insert -- Iub/Iur --, therefor.

In Column 1, Lines 1-2, delete "METHOD AND SYSTEM FOR COMMUNICATION" and insert -- SYNCHRONISATION IN A TERRESTRIAL RADIO ACCESS NETWORK (UTRAN) --, therefor.

In Column 3, Line 51, delete "Transmitting in the Opposite Direction," and insert -- transmitting in the opposite direction, --, therefor.

In Column 4, Line 9, delete "$FN_{In,pres}$," and insert -- $FN_{Iu,pres}$ --, therefor.

In Column 4, Line 64, delete "$FN_I$," and insert -- $FN_{Iu}$ --, therefor.

Signed and Sealed this
Third Day of April, 2012

David J. Kappos
*Director of the United States Patent and Trademark Office*

CERTIFICATE OF CORRECTION (continued)
U.S. Pat. No. 7,738,506 B1

In Column 6, Line 19, in Claim 4, delete "$FN_{Iu},$" and insert -- $FN_{Iu}$ --, therefor.

In Column 6, Line 58, in Claim 9, delete "$FN_{Iu,prev},$" and insert -- $FN_{Iu,prev}$ --, therefor.

In Column 8, Line 43, in Claim 25, after "wherein" delete "the".